(12) United States Patent
Easlea et al.

(10) Patent No.: US 10,198,525 B2
(45) Date of Patent: Feb. 5, 2019

(54) ASSET INTELLIGENCE NETWORK

(71) Applicant: SAP SE, Walldorf (DE)

(72) Inventors: Matthew Easlea, Brisbane (AU); Markus Krabel, Plankstadt (DE); Dean Fitt, Heidelberg (DE); Stephan Bantlin, Baldham (DE); Dirk Kempf, Walldorf (DE); Frank Barthel, Mannheim (DE); Martine Clemot, Stutensee (DE); John Harrison, King City, CA (US); Clarissa Goetz, Heidelberg (DE); Juergen Eisele, Oftersheim (DE)

(73) Assignee: SAP SE, Walldorf (DE)

( * ) Notice: Subject to any disclaimer, the term of this patent is extended or adjusted under 35 U.S.C. 154(b) by 554 days.

(21) Appl. No.: 14/704,274

(22) Filed: May 5, 2015

(65) Prior Publication Data
US 2016/0328411 A1 Nov. 10, 2016

(51) Int. Cl.
*G06F 17/00* (2006.01)
*G06F 17/30* (2006.01)
*G06F 9/451* (2018.01)
*G06F 9/44* (2018.01)
*G06Q 10/06* (2012.01)
*G06Q 10/00* (2012.01)

(52) U.S. Cl.
CPC ........ *G06F 17/3089* (2013.01); *G06F 9/4446* (2013.01); *G06F 9/453* (2018.02); *G06F 17/30864* (2013.01); *G06Q 10/063* (2013.01); *G06Q 10/20* (2013.01)

(58) Field of Classification Search
CPC ..... G06F 17/248; H04L 67/22; H04L 12/185; H04M 3/42
See application file for complete search history.

(56) References Cited

U.S. PATENT DOCUMENTS

| | | | |
|---|---|---|---|
| 8,510,183 B2 | 8/2013 | Scherberger et al. | |
| 8,831,975 B2* | 9/2014 | Golden | G06Q 30/00 705/14.1 |
| 2002/0096563 A1* | 7/2002 | Singhal | G06Q 20/02 235/382.5 |
| 2006/0031478 A1 | 2/2006 | Gopalkrishnan et al. | |
| 2010/0312648 A1 | 12/2010 | Gerome et al. | |
| 2012/0022907 A1 | 1/2012 | Fidler | |
| 2013/0211547 A1 | 8/2013 | Buchdunger et al. | |
| 2013/0254285 A1* | 9/2013 | Ordille | G06F 17/248 709/204 |
| 2014/0089410 A1 | 3/2014 | Ahmed | |

(Continued)

*Primary Examiner* — Cheryl Lewis
(74) *Attorney, Agent, or Firm* — Mintz Levin Cohn Ferris Glovsky and Popeo, P.C.

(57) ABSTRACT

A system, a method, and a computer program product for providing an asset intelligence network to maintain information about various assets are provided. At least one server generates a first information based on a first data received from at least one first party using at least one template. The server uses the template to generate a second information based on a second data received from at least one second party. The second data is related to the first data. Based on the template, the server creates a uniform record containing a combination of the first information and the second information, and stores the created uniform record.

20 Claims, 7 Drawing Sheets

(56) References Cited

U.S. PATENT DOCUMENTS

2014/0156373 A1*  6/2014  Roberts .................. H04L 67/10
                                                          705/14.35
2014/0281846 A1   9/2014  Sorin et al.
2015/0237399 A1*  8/2015  Grandy .............. H04N 21/4622
                                                          725/1

* cited by examiner

| Property | Description | Example |
|---|---|---|
| Serial Number | | |
| Duty specifications | | |
| KW | Kilowatts of the motor | 650KW |

ASSET INTELLIGENCE NETWORK

TECHNICAL FIELD

This disclosure relates generally to data processing and, in particular, to creating and maintaining an asset intelligence network that can include standardized information about various products.

BACKGROUND

In today's world, companies rely on various products, systems, processes, etc. to do business and provide uninterrupted services to their customers. Such products, systems, processes, etc. are typically purchased from various providers and/or manufacturers. After purchase, they are delivered to companies and installed and/or otherwise implemented in companies' daily operations. Periodically, such products, systems, processes, etc. require update, service, repair, replacement, change, etc. A service provider may be contacted by a company to perform updates, service, repairs, etc. The service provider can be appropriately certified to perform these services.

In purchasing, operation, service, repair, companies as well as service providers rely on information that can be provided by manufacturers of the product, system, process, etc. purchased by the company. This information can include product identification information, installation manuals, operation manuals, maintenance manuals, repair manuals, etc. Without this information, operation, service, repair, etc. may be very difficult and/or impossible to perform. Sometimes, owners of a particular product, process, system, etc. as well as service providers may wish to submit various information to the manufacturer that can relate to the operation, service, repair, etc. However, current systems do not provide a way to ensure that the information exchanged between the manufacturer, the owner, and/or the service provider particular product, process, system, etc. is created and shared in a uniform and/or standardized way, which can allow for a more efficient and/or cost-effective manufacturing, operation, repair, servicing of such product, process, system, etc.

SUMMARY

In some implementations, the current subject matter relates to providing an asset intelligence network to maintain information about various assets. The method can include generating, by at least one server, using at least one template, a first information based on a first data received from at least one first party in a plurality of parties. The plurality of parties can form a subscription-based network, where to submit the first data for generating the first information based on the template, the parties can be required to be subscribed members of the subscription-based network. The first party can be a member of the subscription-based network. The template can be associated with at least one asset of at least one party in the plurality of parties. The method can further include generating, by the server, using the template, a second information based on a second data received from at least one second party in the plurality of parties. The second data being related to the first data. The second party can be a member of the subscription-based network. The method can also include creating, by the server, based on the template, a uniform record containing a combination of the first information and the second information associated with the asset, and storing the created uniform record.

In some implementations, the current subject matter can include one or more of the following optional features. The first party and the second party can include at least one of the following: an asset provider, an asset operator, a service provider, and a third party. The first data can be generated by the asset provider. The first data can include at least one of the following: an equipment taxonomy information, a nameplate information, equipment installation parameters, equipment design and drawings, equipment structure/parts, equipment failure codes/modes of operation, equipment safety controls, equipment process controls, equipment measuring point/telemetry requests, equipment maintenance/inspection strategies, equipment operation and/or maintenance instructions, equipment product training materials, equipment service bulletins and/or revision control, equipment recall information, equipment design improvements, and equipment licenses.

In some implementations, the second data can be generated by the asset operator. The second data can include at least one of the following: equipment installation information, equipment risk and/or control information, equipment maintenance history, equipment usage information, equipment failure/incident data, equipment service bulletin processing, equipment recall processing, and equipment design recommendations.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates an exemplary nameplate;

DETAILED DESCRIPTION

Figure 1:
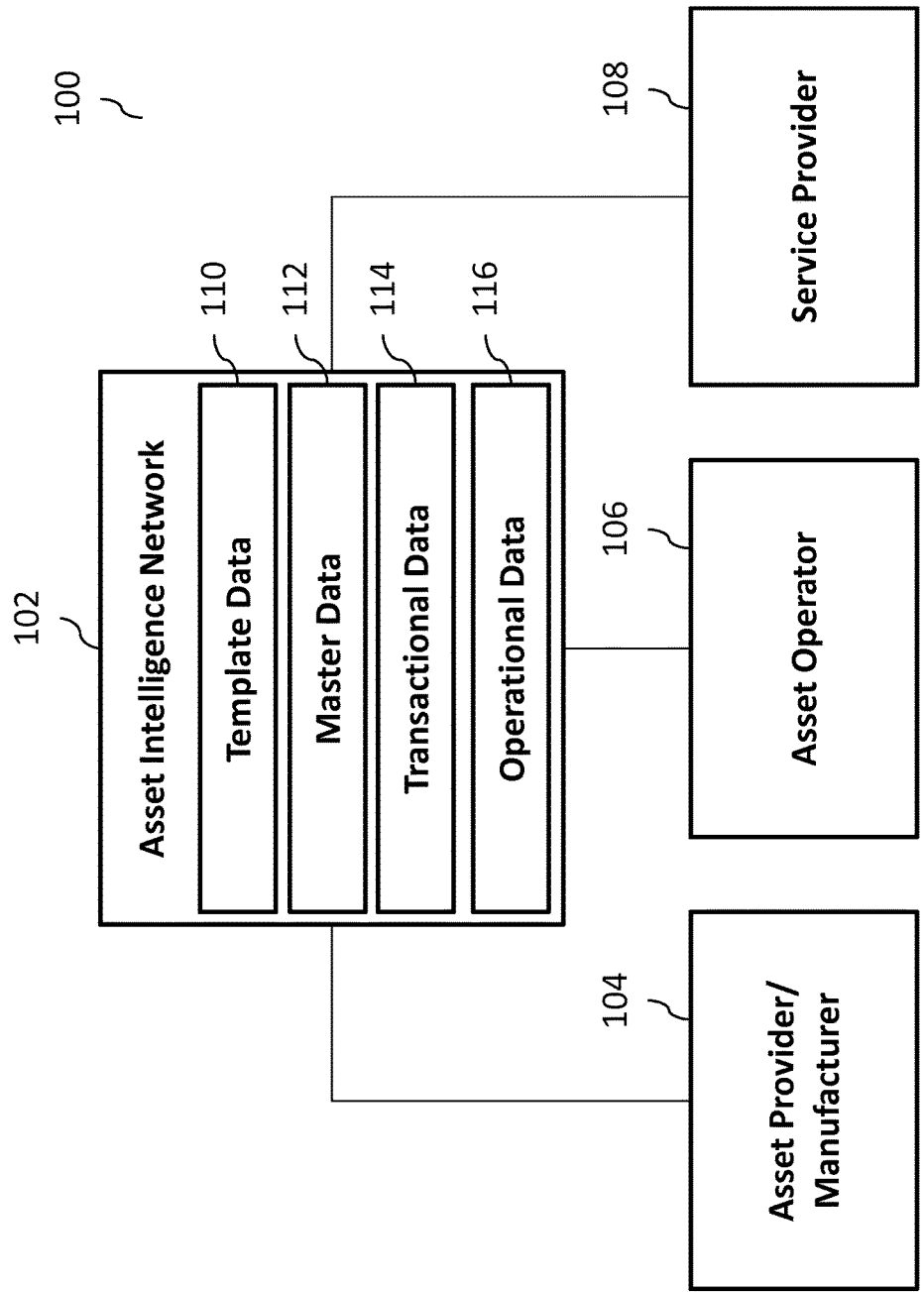
FIG. 1 illustrates an exemplary asset intelligence system, according to some implementations of the current subject matter.

To address these and potentially other deficiencies of currently available solutions, one or more implementations of the current subject matter provide methods, systems, articles or manufacture, and the like that can, among other possible advantages, provide for an asset intelligence network that can include information about various products.

In some implementations, the current subject matter relates to providing an asset intelligence network that can be used to perform management and optimization of information about particular assets, such as various products, systems, methods, etc. The current subject matter can be used to create, manage, and allow sharing of information and/or business models about such products, systems, methods, etc. The current subject matter can further allow various entities (e.g., companies, industries, etc.) to collaborate among themselves in creation, management, and sharing of such information.

In some implementations, the current subject matter relates to a method for providing an asset intelligence network. The method can include providing a cloud network to bring together manufactures or asset providers, owners or asset operators, and/or service providers of various assets (e.g., products, systems, processes, etc. (hereinafter, "equipment")) to maximize value, improve efficiency and create new business models. The current subject matter can communicatively connect various entities (e.g., manufacturers, owners, operators, service providers, etc.) together via a communication network. The entities can submit content, review content, revise existing content, share content, store content, etc. that can relate to various products, systems, processes, etc. The content can be in a standardized form that can be defined for the asset intelligence network. The standardized form can ensure that the data stored about the products, systems, processes, etc. has a high quality and is consistent throughout.

Currently, many manufacturers, owners, operators, service providers, etc. are unable to optimize performance of various equipment, processes, etc. because of a significant overhead of creating and/or managing definitions, descriptions, and/or other information describing the equipment, processes, etc. at the required level of granularity. Because all different parties (e.g., manufacturers, owners, operators, third-party service providers, etc.) have different definitions of equipment, processes, etc., it remains incredibly difficult to collaboratively schedule, execute and/or review work, let alone develop global performance benchmarks for performance of equipment, processes, etc. Additionally, conventional systems are unable to systematically compare asset performance across geographies and industries. Having common standardized information concerning equipment, processes, etc., can be helpful in outsourcing of services which typically requires sharing and common understanding of asset data. Further, the conventional systems are not able to address the situations when new business models are deployed (e.g., where manufacturer a production capacity as opposed to a product).

In some implementations, the current subject matter can provide for network that can allow manufacturers, owners, service providers, etc. ("subscribing entities") to publish definition(s) of equipment, processes, etc. in the network to which various entities can subscribe to. The subscribing entities can use the network in a cloud-like environment. The network can also provide the subscribing entities with various standard templates that can be used to describe each specific equipment, process, etc. The subscribing entities can complete the templates with information describing the equipment, process, etc. and have it stored on the network (e.g., in the cloud). The network can also provide for collaborative shared asset structures, joint processing of service bulletins, vendor provided part catalogs specific to the asset at required detailed level, creation of common solution database for maintenance and service challenges, customer feedback, versioning information, an original equipment manufacturer ("OEM") independent information resource that can reduce time to find information and enable comparison scenarios (e.g., reduction of manual labor costs, easy access to all relevant real time information, reduction in switching costs; inventory pooling, up-to-date asset information, proactive real time service notifications, reduced service costs, etc.), an OEM-operator field service optimization, lifecycle management of asset information, etc.

FIG. 1 illustrates an exemplary asset intelligence system 100, according to some implementations of the current subject matter. The system 100 can include an asset intelligence network 102, an asset provider (e.g., a manufacturer) 104, an asset operator (e.g., a customer) 106, and a service provider 108. The entities 104-108 can subscribe to the network 102 and can provide information to the network 102. The information can include various product (e.g., equipment, process, service, etc.) identification information, product description information, product operation information (e.g., instructions on how to operate a particular piece of equipment), service information (e.g., a service manual, service records, etc.), troubleshooting information (e.g., problems encountered with operation of a particular equipment and how they were addressed, etc.), warranty information as well as any other information.

In some implementations, the asset intelligence network 102 can be a cloud type network. The network 102 can be a collection of servers, databases, and/or any other type of computing devices, and can include various hardware, software, and/or any combination thereof. The network 102 can also provide various network communication capabilities to its subscribers, i.e., entities 104-108. The network 102 can be any type of network (e.g., wide area network ("WAN"), local area network ("LAN"), metropolitan area network ("MAN"), internet, extranet, intranet, and/or any other type of wireless and/or wired network).

In some implementations, the network 102 can receive and/or store various asset information (e.g., about equipment, processes, services, etc.). The asset data can include template data 110, master data 112, transactional data 114, and operational data 116. The template data 110 can include various templates that can be available to the subscribing entities to fill in information about a particular equipment, process, service, etc. The templates can specific to various products, industries, services, operation, maintenance, repair, etc. The master data 112 can encompass all data that has been submitted to the network 102 by the subscribing entities 104-108. The transactional data 114 can include data related to various transactions that may have been performed in connection with a particular equipment, process, service, etc. The operational data 116 can contain information about operations and/or services associated with a particular equipment, process, service, etc. The network 102 can include an ability to organize and classify the submitted data in standardized format that can be uniform across a particular industry and/or across all industries, type of equipment, process, service, etc., service and/or maintenance associated with equipment, process, service, etc., as well as in any other fashion.

In some implementations, the network 102 can create and/or manage connections for the exchange of information between various subscribing entities, e.g., manufacturers, regulators, spare parts suppliers, asset operators, and other third parties. For example, the network 102 can allow manufacturers (e.g., asset providers 104) to submit and/or publish definitions of equipment, process, service, etc. to the network 102. The definitions can include names of the equipment, process, service, etc., manuals, standard notations, etc. Purchasers, owners, leases, etc. (e.g., asset operators 106) of the equipment, process, service, etc. can subscribe to the network 102 by providing details about serial numbers, components, manufacturers, etc., where the network 102 can then match this information to the details provided by the manufacturers 104. In some implementations, in order to join the network 102, the asset providers 104 can provide details about their equipment, process, service, etc.

In some implementations, the network 102 can allow submission of content by the asset provider 104, asset operator 106, service provider 108, and/or any other party. The content that can be submitted by the asset provider can include at least one of the following: an equipment taxonomy information, a nameplate information, equipment installation parameters, equipment design and drawings, equipment structure/parts, equipment failure codes/modes of operation, equipment safety controls, equipment process controls, equipment measuring point/telemetry requests, equipment maintenance/inspection strategies, equipment operation and/or maintenance instructions, equipment product training materials, equipment service bulletins and/or revision control, equipment recall information, equipment design improvements, equipment licenses, etc. The content that can provided by the asset operator 106 can include at least one of the following: equipment installation information, equipment risk and/or control information, equipment maintenance history, equipment usage information, equipment failure/incident data, equipment service bulletin processing, equipment recall processing, equipment design recommendations, etc. The details of the above content are discussed further below.

In some implementations, the information received, processed, stored and/or made available by the network 102 to its users (i.e., the asset providers 104, the asset operators 106, and service providers 108, and/or any others) can be used in a variety of applications. Some exemplary applications include at least one of the following: manufacturer's applications, asset lifecycle, third party service providers, OEM service, work permit management, notifications/ticketing, work management/joint work scheduling, transfer of ownership, contract management, benchmarking and/or comparisons, parts verification, warranties, refurbishment, global inventory tracking, lease management, knowledge base, etc. These applications are discussed in further detail below.

Figure 2:
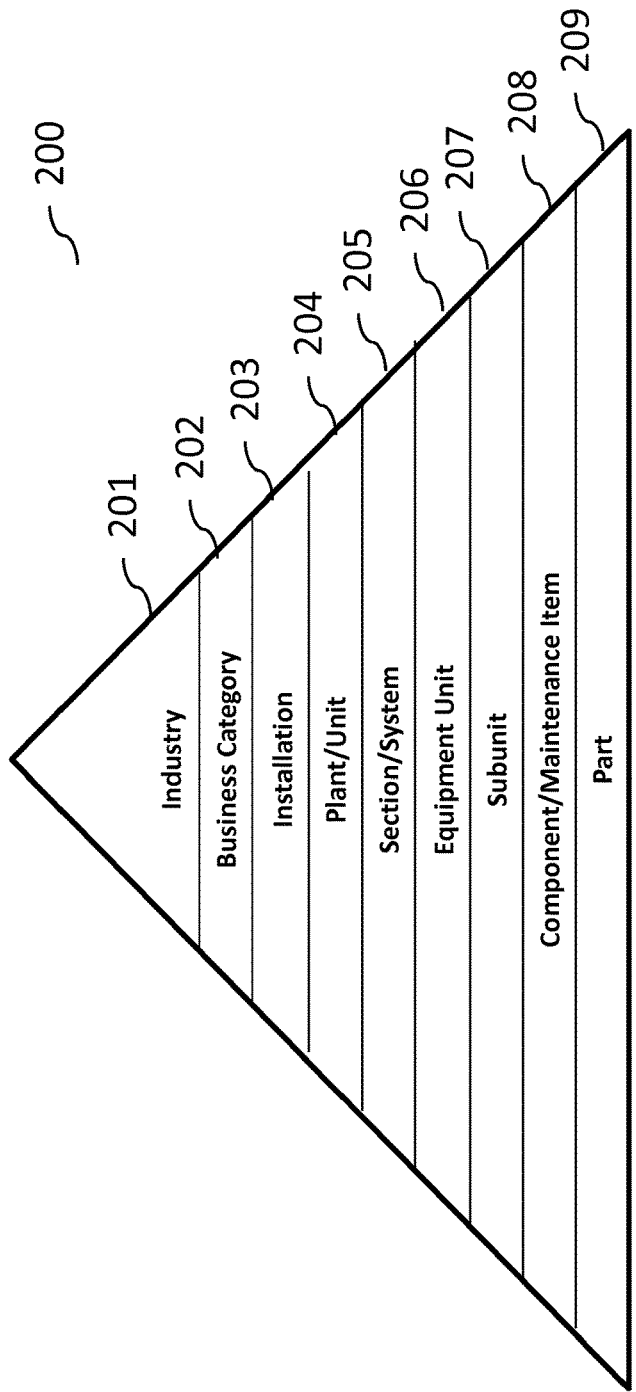
FIG. 2 illustrates an exemplary taxonomical structure that can be used to classify description of equipment, process, service, etc. that is being submitted by the asset provider.

The information that can be provided by the asset provider 104 to the network 102 can be classified according to an agreed taxonomy, which can define standard nomenclature, naming, hierarchy, etc. for the equipment, process, service, etc. across various industries, suppliers, geographical regions, etc. FIG. 2 illustrates an exemplary taxonomical structure 200 that can be used to classify description of equipment, process, service, etc. that is being submitted by the asset provider 104. The taxonomical structure 200 can be based on an international standards organization ("ISO") standard ISO14224, which defines a nine-level hierarchy, where levels 1-5 are customer specific and explain how and where equipment can be used. Levels 6-9 illustrate specifics about an actual equipment unit. In some implementations, the asset provider 104 (shown in FIG. 1) can provide information related to levels 6-9, which can be in a standardized format.

As shown in FIG. 2, the taxonomical structure 200 can include an industry level 201, a business category level 202, an installation level 203, a plant/unit level 204, a section/system level 205, an equipment level 206, a subunit level 207, a component/maintenance item level 208, and a part level 209. Levels 201-205 relate to specific use and/or location of particular equipment. Levels 206-209 relate to specific equipment subdivision. In particular, level 206 can relate to a class of similar equipment units, where each equipment class contains equal equipment units (e.g., compressors). Some non-limiting examples of level 206 equipment can include a heat exchanger, a compressor, a piping, a pump, a boiler, a gas turbine extruder, an agitator, a furnace, a blow-out preventer, etc. Level 207 can be defined as a subsystem necessary for the equipment unit to function. Some non-limiting examples of the subunits in level 207 can include a lubrication subunit, a cooling subunit, a control and monitoring subunit, a heating subunit, a pelletizing subunit, a quenching subunit, a refrigeration subunit, a reflux subunit, a distributed control subunit, etc. Level 208 can be defined as a group of parts of the equipment unit that are commonly maintained (repaired/restored) as a whole. Some non-limiting examples of items in level 208 can include a cooler, a coupling, a gearbox, a lubrication oil pump, an instrument loop, a motor, a valve, a filter, a pressure sensor, a temperature sensor, an electric circuit, etc. Level 209 can be defined as a single piece of equipment. Some non-limiting examples of the part in level 209 can include a seal, a tube, a shell, an impeller, a gasket, a filter plate, a bolt, a nut, etc.

In some implementations, the current subject matter can standardize names of equipment and provide alternative naming for pieces of equipment, such as in situations where different geographies/industries are using different terms for the same equipment. In some implementations, the network 102 can store specific nameplate information for a particular piece of equipment, process, service, etc. The nameplate information can be used on equipment to designate name, serial number, various attributes, etc. that can describe the equipment. Physical nameplates can be designed to be attached to the equipment. An exemplary nameplate 300 is illustrated in FIG. 3. The nameplate 300 can include information about equipment's serial number, duty specifications, power, etc. The nameplate 300 stored in the network 102 (shown in FIG. 1) can include additional information, characteristics, properties, etc. The serial number can be a unique identifier of the equipment. Some non-limiting examples of the serial number can include a Global Individual Asset Identifier ("GIAI"), from the GS1 group, Unique Item Identifier (UID) from the US Department of Defense, a Vehicle Identification Numbers (VIN), an Electronic Serial Number (ESN), etc.

In some implementations, the asset operators 106 (shown in FIG. 1) can upload serial numbers (and/or manufacturer names) to the network 102, where the network 102 can perform a match with details that have been provided by the asset provider 106 for particular equipment. The matching can create a relationship between the asset operator 106 and asset provider 102 in connection with that equipment. In some implementations, the asset operator 106 can also upload a photograph of the nameplate for the equipment to the network 102. An optical character recognition ("OCR") technique can be used to determine the details of the equipment from the photograph of the nameplate.

In some implementations, the network 102 can also store information about installation parameters for particular equipment. The installation parameters can define where the equipment can be allowed to be installed and under what conditions. Some exemplary installation parameters can include power requirements, redundant circuitry/wiring, fireproof box meeting a certain hazmat rating, indication that equipment must not be in an explosive area, description of a physical environment (e.g., recommended limits for dust, moisture, temperature, etc.), indication of how performance of the equipment unit can change based on installation and usage (e.g., equipment can behave differently based on gradient/air pressure), a physical clearance (e.g., ensure that equipment has clearance of x meters for air flow/ventilation and to provide safe access to maintain), etc.

In some implementations, the network 102 can store designs and/or drawings for the equipment. Some non-limiting examples of these can include physical height, width, depth of an equipment unit, EPC design, three-dimensional equipment explosion, fuel inputs, monitoring inputs and outputs (sensors), RF232 jacks, wiring connections, recommended third party equipment, etc. This information can provide asset operators with a visibility to engineering designs to perform maintenance operating procedures and improve designs.

In some implementations, the network 102 can also store information about structure and/or parts associated with particular equipment. Some non-limiting examples of these can include manufacturer part numbers, equipment subdivision (e.g., a crusher contains a motor, a motor contains a rotor, etc.), materials defined for the maintenance tasks and the overall equipment unit, etc. This information can provide ability for the asset provider 104 to publish a bill of material and for the asset operator 106 to subscribe to it. This can also allow the asset operators 104 to receive various notifications concerning the equipment.

In some implementations, the network 102 can store information about failure codes and/or modes. This information can provide a way for the asset provider 104 to standardize content that can be delivered with asset provider's equipment and for the asset operator 106 to import this content and improve, as desired. The information can include an indication of unsafe failure modes (e.g., failure modes that can result in a hazardous equipment state) based on a particular equipment type. The network 102 can perform real-time analysis of and standardize such failure codes and/or modes across industries and/or equipment classes.

The network 102 can also store information concerning safety controls for particular equipment. Exemplary non-limiting safety controls can include specific protective hardware, requirement of a specific number of personnel to operate the equipment, rope/harnessing/breathing equipment, etc., qualifications of workers, training instructions for workers, a training plan, etc. The asset provider 104 can provide the asset operator 106 with a catalog of risks and/or safety controls that can be applicable to the equipment.

In some implementations, the network 102 can store information about process controls for the equipment. These can include various instructions that are provided by the asset provider 104 to the asset operator 106. The information can include safety check lists, operation procedures, warnings, operational limits, etc.

In some implementations, the network 102 can store information about maintenance and/or inspection strategy. The maintenance strategy can define what needs to be performed (e.g., tasks) to maintain equipment and how often it needs to be performed (e.g., intervals, frequencies, etc.). For inspections, the network 102 can store information as to when to inspect and/or how to inspect. This information might not necessarily result in maintenance work and/or changes being made to the equipment. The network 102 further allow asset operators 106 to import manufacturer recommended maintenance strategies, override/optimize manufacturer's recommendations and/or to store the changes and reason why they made the change, share changes back to manufacturer for further analysis, etc. As a result, the asset provider 104 can learn how asset operators are actually using and maintaining their equipment.

In some implementations, the network 102 can store information about operation and/or maintenance instructions. The operation instructions can include information as to how to operate the equipment, e.g., drive the vehicle. The maintenance instructions can include information as to how to maintain the equipment.

In some implementations, the network 102 can store information about service bulletins, revision control, etc. concerning the equipment. This information can include at least one of the following: hardware updates/changes (including appropriate documentations), software upgrades/changes (e.g., updates to versions of software, etc.), etc. Such service bulletins, revision control, etc. can be issued when a new part number for equipment is issued by the asset provider 104. The asset operator 106 can request to receive the bulletins, revision control, etc. automatically once the manufacturer issues them. This can affect suppliers/distributors that have inventory of the affected parts. The network 102 can support processing and capturing of the receipt and internal distribution of the service bulletin as well as track processing status of the service bulletin within all owners systems. The network 102 can also provide various messages to the manufacturer, e.g., that the asset operator 106 received the service bulletin, that the asset provider 106 applied the service bulletin, etc. The manufacturer can know that every asset operator using manufacturer's equipment has the latest information. When a new asset operator 106 joins the network 102, they can receive all services bulletins from all manufacturers for all their equipment (such as during a particular time period requested). If any bulletins have been missed by the asset operator, the asset provider can supply them through the network 102.

The network 102 can also provide information about equipment recalls. A manufacturer can use network 102 to notify and track that all asset operators with an equipment unit are advised and return equipment for repair/replacement. In some implementations, all recalls can be related to a service bulletin. The asset provider 104 can be assured that all asset operators receive and have the option of returning the equipment unit. The network 102 can also provide an ability to schedule repair/replacement of the affected equipment. The network 102 can provide tracking of return and repair (e.g., using a serial number of the equipment to determine when it was posted, when it was received, when it was returned, etc.)

In some implementations, the network 102 can also store information about design improvements for particular equipment. This can allow asset providers 104 to poll asset operators 106 for equipment feature requests as well as contact asset operators 106 that operate the equipment and request information from them about equipment operation.

In some implementations, the asset operator 106 can submit information to the network 102 for manufacturer 104 to review. This information can include equipment installation information, which can be at least one of the following: where equipment is installed and the environment that it is operating in, GIS information/3D mapping, level 5 and above of the ISO taxonomy, equipment operational use case(s), how many hours the equipment can be operated, etc.

In some implementations, the asset operator 106 can supply information about risk and/or control associated with the use of equipment, which can include at least one of the following safety risks and/or process risks. This information can allow the manufacturer to understand at least one of the following: how the equipment is being used, which can be used to improve future models/revisions of the equipment; provide real life examples back to the manufacturer of the risks and safety controls that exist for the equipment unit; environmental risks; regulations, etc.

In some implementations, the network 102 can store information about equipment maintenance history that can be provided by the asset operator 106. This can include information as to how the asset operator maintained equipment. For example, the information can include at least one of the following: when and which services were performed and when as well as time taken by the asset operator to perform the service.

The asset operator 106 can also provide equipment usage information to the network 102. This information can indicate to the manufacturer 104 the state of equipment, the date it was commissioned, etc. In some implementations, the information can also indicate how the equipment is being used (e.g., normal operating state/mode, running active, standby, intermittent operation, etc.), equipment operating conditions, how equipment operation affects equipment warranty, etc.

In some implementations, the asset operator can provide failure/incident data to the network 102, which the manufacturer 104 can review. This process can provide a consistent way for asset operator 104 to report a problem (e.g., failure, incident, observation, etc.) using standardized codes. An incident can be an event related to an existing (and/or new) hazard where equipment is involved (e.g., directly and/or indirectly). A failure can be related to equipment breakdown/malfunction and can be related to an existing (and/or new) failure code. The network 102 can allow the asset operator 104 to send questions associated with a failure to the manufacturer and to track the response. The network 102 can also allow the manufacturer to view failure data and to solve equipment failures. This information can be used by the manufacturer in a potential design improvement and/or service bulletin/recall and/or other recommendation process. Additionally, the network 102 can be used to report to government agencies about incidents/failures of equipment based on regulations that have been impacted by such failures/incidents. Moreover, the manufacturer can be supplied with information regarding root cause analysis for incidents and/or failures.

In some implementations, the network 102 can be provide asset providers 104, asset operators 106, service providers 108, and/or any other parties with valuable tools that can be used to manage information about equipment being sold, used, serviced, etc. and provide an appropriate lifecycle management.

In some implementations, the network 102 can be used to provide the manufacturer 104 with equipment sustainability information. This can allow manufacturers to ascertain lifecycle of the equipment and potentially take charge of a total lifecycle responsibility for the equipment from the delivery of the equipment to the asset operator 106 to its disposal, return, and/or refurbishment. The equipment lifecycle can include various stages, which can include at least one of the following: acquisition, reselling, disposal, etc. During the entire lifecycle of the equipment, the history of the events associated with the equipment and corresponding data can be maintained by the network 102. In some implementations, the amount of data associated with the equipment can be limited by a particular time period (e.g., 20 years).

In some implementations, the network 102 can provide a portal that can provide interaction between the service provider 108 and the manufacturer 104 and the asset operator 106. As part of this portal, the network 102 can store a listing of what authorized services the service provider 108 can perform on the equipment. The manufacturer can approve service provider 108 to perform such service and/or can recommend service provider 108 to perform a specific service. The service provider 108 can suggest to perform a service without approval from the manufacturer. The service provider 108 can also request various information from the manufacturer relating to the equipment, its operation, and/or servicing.

In some implementations, the network 102 can also store information about standardized services that can be defined by the manufacturer for the equipment which can be provided by either the manufacturer and/or a third party. These services can include at least one of the following: in situ repair, calibration, lubrication, installation, replacement and/or refurbishment of parts, training services, etc.

In some implementations, the network 102 can also provide work permit management, which can be relevant and/or required to the planning and/or issuing of permits that can be required to safely maintain the equipment. The asset operator 106 can determine whether the provided permit requirement is from manufacturer while planning and performing work. Collaborative work permits between operators, owners and other third parties can provide visibility to the status of work permits to third party organization and can enhance planning of repairs.

In some implementations, the asset operator 106 can use the network 102 to submit a notification to the manufacturer 104 and/or service provider 108 to perform a particular action (e.g., repair, replacement, etc.). The network 102 can also be used to perform work management and/or joint work scheduling. The asset provider 104, the asset operator 106 and/or service provider 108 can collaborate on viewing and/or updating a particular shared work order relating to, for example, repair of the equipment.

In some implementations, the network 102 can be used to transfer ownership of equipment and to track ownership history. Further, the network 102 can store information about service level agreements and/or contract management relating to the equipment. The service level agreements can be used by the asset provider 104 to provide various guarantees to the asset operator 106 as to specific repair and/or replacement of the equipment. Additionally, the network 102 can store information concerning asset benchmarking and/or comparison.

In some implementations, the network 102 can be used to perform parts verification. This can be useful in identifying counterfeit parts, wrong parts, etc. before they are used in the equipment. Manufacturer and/or asset operator can be alerted when wrong serial numbers are entered. Further, if the part is serialized, then the manufacturer can detect when duplicate serial numbers are being used. Moreover, if the asset operator enters the serial number incorrectly, then the manufacturer can generate an appropriate alert to the asset operator.

In some implementations, the network 102 can also be used to store and/or manage information relating to equipment warranties, transferability of warranties, refurbishment of equipment, reuse of equipment, global inventory, regional inventory, local inventory, etc.

In some implementations, the network 102 can provide lease management, which can be a process where manufacturer leases instead of selling equipment to the asset provider 106. In the lease-oriented arrangements, the manufacturer accounts for rendering services instead of supplying goods. The asset provider 106 can buy a service through monthly fees instead of buying a product outright.

In some implementations, the network 102 can maintain a knowledge base, where users of the network can collaborate and share information on the equipment, use cases, problems, problem solution, operation issues, etc.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 4:
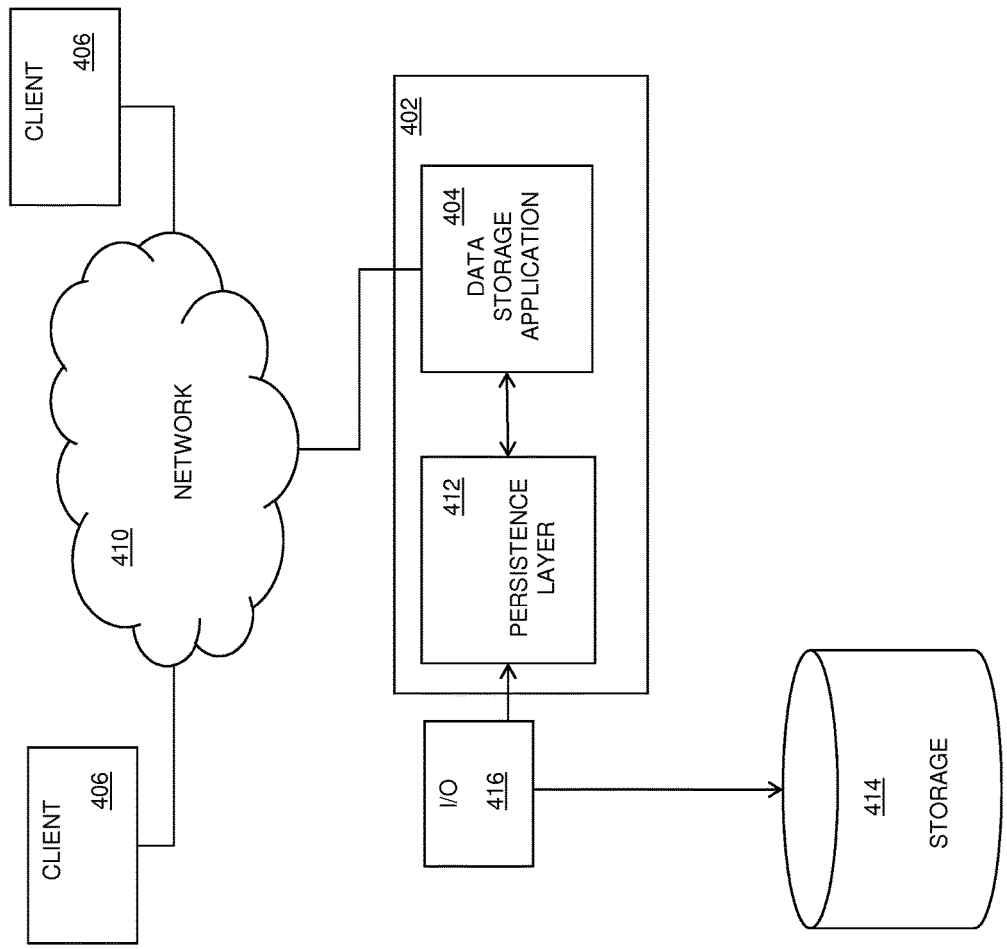
FIG. 4 is a diagram illustrating an exemplary system including a data storage application, according to some implementations of the current subject matter.

FIG. 4 illustrates an exemplary system 400 in which a computing system 402, which can include one or more programmable processors that can be collocated, linked over one or more networks, etc., executes one or more modules, software components, or the like of a data storage application 404, according to some implementations of the current subject matter. The data storage application 404 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 402 as well as to remote users accessing the computing system 402 from one or more client machines 406 over a network connection 410. One or more user interface screens produced by the one or more first modules can be displayed to a user, either via a local display or via a display associated with one of the client machines 406. Data units of the data storage application 404 can be transiently stored in a persistence layer 412 (e.g., a page buffer or other type of temporary persistency layer), which can write the data, in the form of storage pages, to one or more storages 414, for example via an input/output component 416. The one or more storages 414 can include one or more physical storage media or devices (e.g. hard disk drives, persistent flash memory, random access memory, optical media, magnetic media, and the like) configured for writing data for longer term storage. It should be noted that the storage 414 and the input/output component 416 can be included in the computing system 402 despite their being shown as external to the computing system 402 in FIG. 4.

Data retained at the longer term storage 414 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 5:
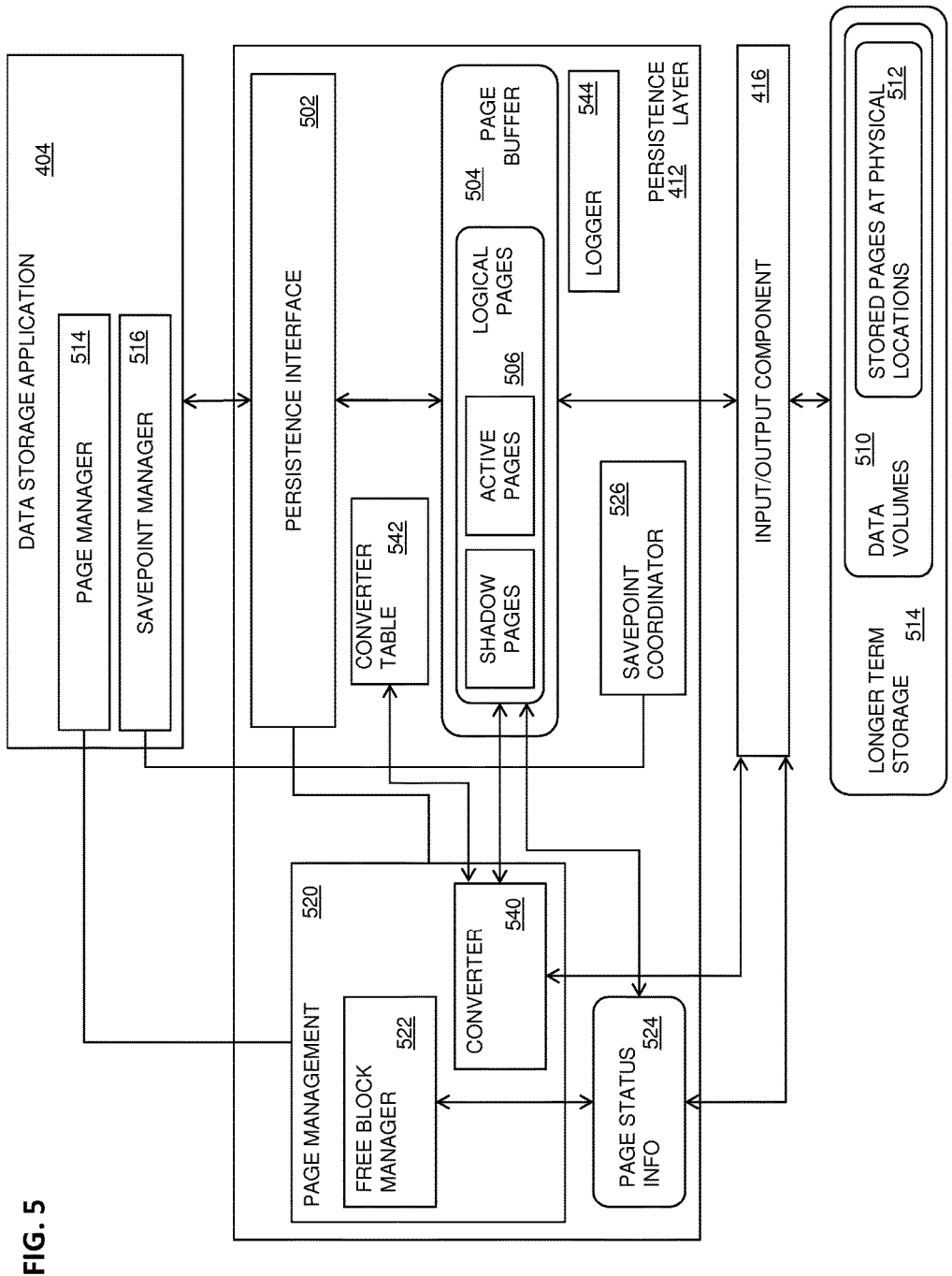
FIG. 5 is a diagram illustrating details of the system of FIG. 4.

FIG. 5 illustrates exemplary software architecture 500, according to some implementations of the current subject matter. A data storage application 404, which can be implemented in one or more of hardware and software, can include one or more of a database application, a network-attached storage system, or the like. According to at least some implementations of the current subject matter, such a data storage application 404 can include or otherwise interface with a persistence layer 412 or other type of memory buffer, for example via a persistence interface 502. A page buffer 504 within the persistence layer 412 can store one or more logical pages 506, and optionally can include shadow pages, active pages, and the like. The logical pages 506 retained in the persistence layer 412 can be written to a storage (e.g. a longer term storage, etc.) 414 via an input/output component 416, which can be a software module, a sub-system implemented in one or more of software and hardware, or the like. The storage 414 can include one or more data volumes 510 where stored pages 512 are allocated at physical memory blocks.

In some implementations, the data storage application 404 can include or be otherwise in communication with a page manager 514 and/or a savepoint manager 516. The page manager 514 can communicate with a page management module 520 at the persistence layer 412 that can include a free block manager 522 that monitors page status information 524, for example the status of physical pages within the storage 414 and logical pages in the persistence layer 412 (and optionally in the page buffer 504). The savepoint manager 516 can communicate with a savepoint coordinator 526 at the persistence layer 412 to handle savepoints, which are used to create a consistent persistent state of the database for restart after a possible crash.

In some implementations of a data storage application 404, the page management module of the persistence layer 412 can implement a shadow paging. The free block manager 522 within the page management module 520 can maintain the status of physical pages. The page buffer 504 can include a fixed page status buffer that operates as discussed herein. A converter component 540, which can be part of or in communication with the page management module 520, can be responsible for mapping between logical and physical pages written to the storage 414. The converter 540 can maintain the current mapping of logical pages to the corresponding physical pages in a converter table 542. The converter 540 can maintain a current mapping of logical pages 506 to the corresponding physical pages in one or more converter tables 542. When a logical page 506 is read from storage 414, the storage page to be loaded can be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 can ensure that changes made in the data storage application 404 are durable and that the data storage application 404 can be restored to a most recent committed state after a restart. Writing data to the storage 414 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 544 can also be included to store the changes made to the data of the data storage application in a linear log. The logger component 544 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 544 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 412 can use a combination of undo log entries (from one or more logs) and shadow paging.

The persistence interface 502 can handle read and write requests of stores (e.g., in-memory stores, etc.). The persistence interface 502 can also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 544 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 544 can write a database log (or simply referred to herein as a "log") sequentially into a memory buffer in natural order (e.g., sequential order, etc.). If several physical hard disks/storage devices are used to store log data, several log partitions can be defined. Thereafter, the logger 544 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 404 can use shadow paging so that the savepoint manager 516 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 6:
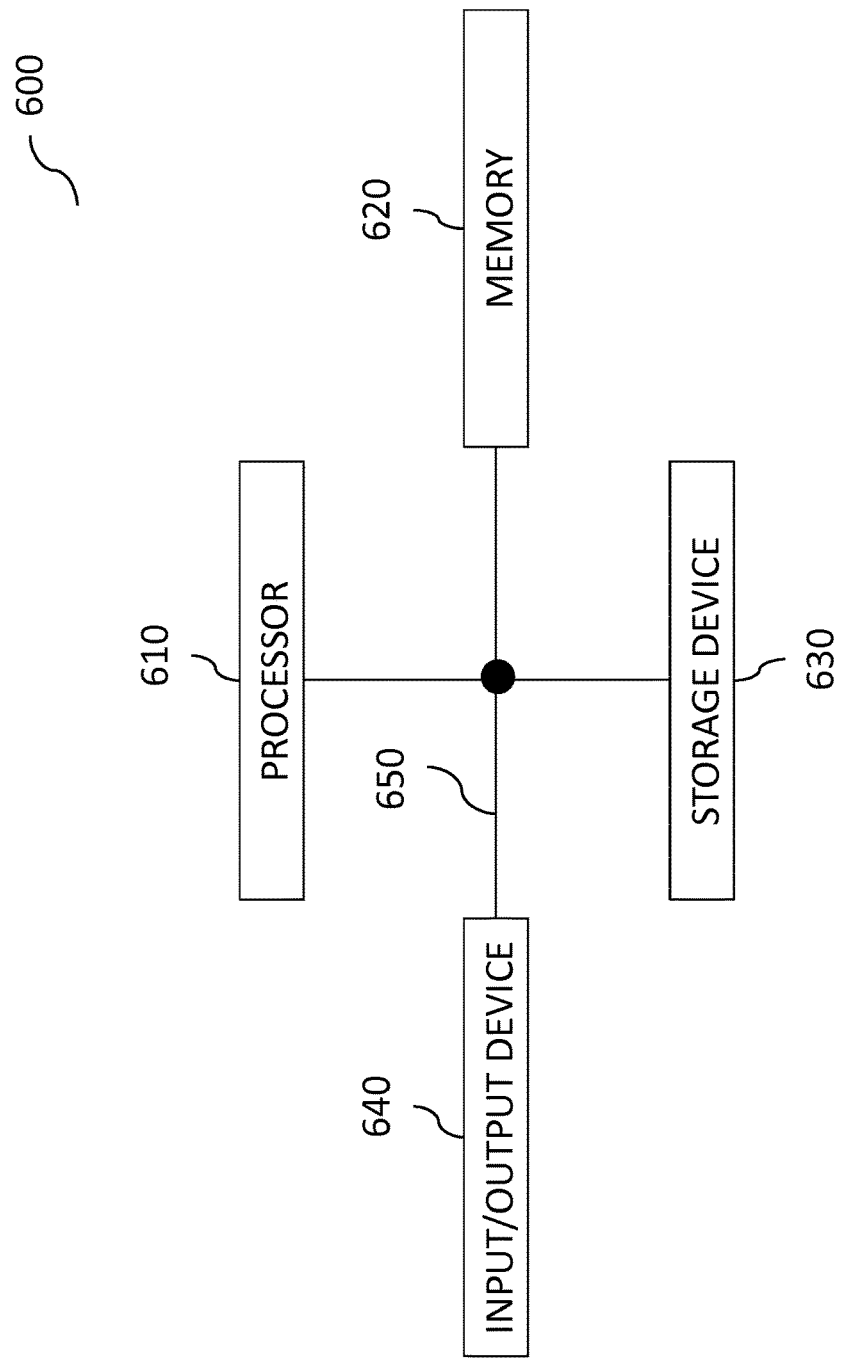
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
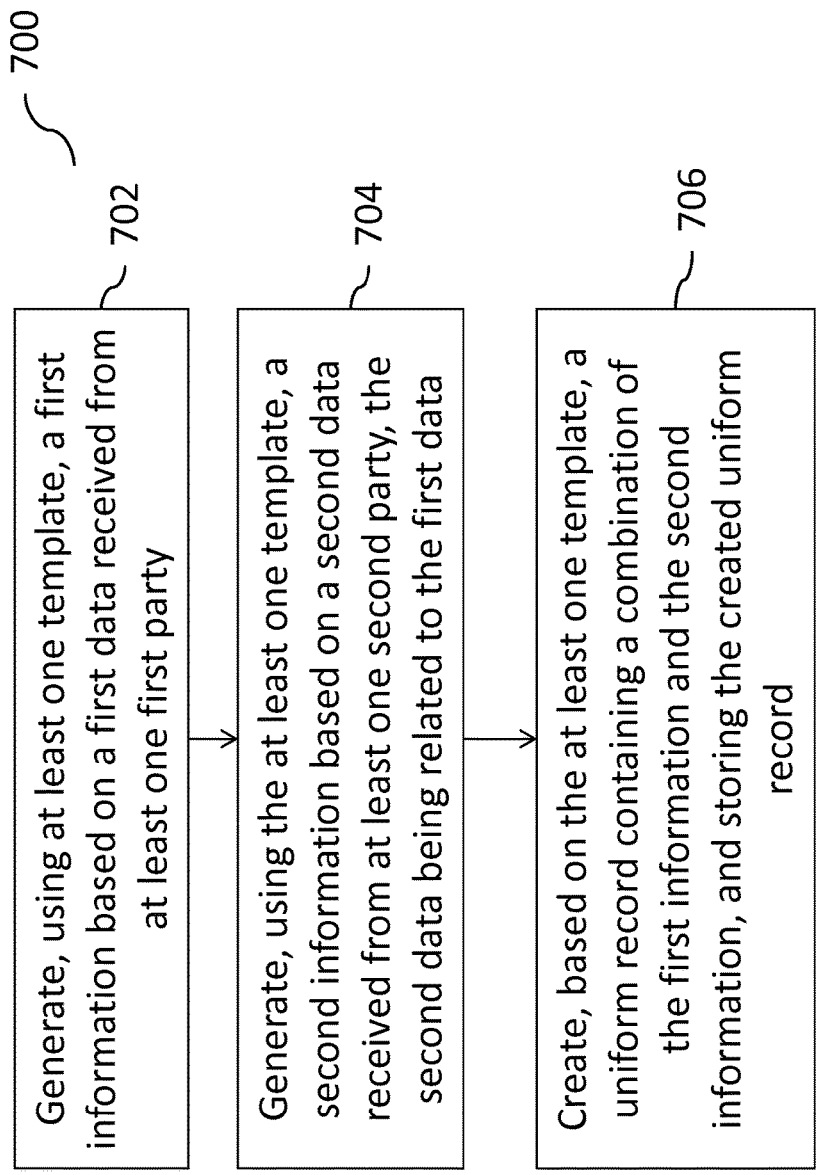
FIG. 7 is an exemplary method, according to some implementations of the current subject matter.

FIG. 7 illustrates an exemplary method 700 for providing an asset intelligence network to maintain information about various assets, according to some implementations of the current subject matter. At 702, a first data can be generated by at least one server using at least one template. The first data can be received from the at least one first party (e.g., a manufacturer). The first party can be part of a plurality of parties that can form a subscription-based network. In order to submit first data to the network to generate information based on the at least one template, the parties can be required to be subscribed members of the subscription-based network. The first party can be a member of the subscription-based network. The template can be associated with a particular asset (e.g., process, equipment, device, etc.) of at least one party in the plurality of parties.

At 704, a second data can be generated by the server using the template. The second data can be received from at least one second party (e.g., an asset operator). The second data can be related to the first data. The second party can also be subscribed to the subscription-based network that the first party is a member of.

At 706, the server can create a uniform record containing a combination of the first data and the second data submitted using the template, and store the created uniform record. The combination of data can be related to the asset for which information has been submitted.

In some implementations, the current subject matter can include one or more of the following optional features. The first party and the second party can include at least one of the following: an asset provider, an asset operator, a service provider, and a third party. The first data can be generated by the asset provider. The first data can include at least one of the following: an equipment taxonomy information, a nameplate information, equipment installation parameters, equipment design and drawings, equipment structure/parts, equipment failure codes/modes of operation, equipment safety controls, equipment process controls, equipment measuring point/telemetry requests, equipment maintenance/inspection strategies, equipment operation and/or maintenance instructions, equipment product training materials, equipment service bulletins and/or revision control, equipment recall information, equipment design improvements, and equipment licenses.

In some implementations, the second data can be generated by the asset operator. The second data can include at least one of the following: equipment installation information, equipment risk and/or control information, equipment maintenance history, equipment usage information, equipment failure/incident data, equipment service bulletin processing, equipment recall processing, and equipment design recommendations.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   subscribing, by at least one server, a plurality of parties to a subscription-based network, the plurality of parties including at least one first party
   receiving, by the at least one server, a first data from the at least one first party, the first data comprising template data, master data, transactional data, and/or operational data;
   generating, by the at least one server and in response to receiving the first data, using at least one template, a first information based on, the at least one first party being a member of the subscription-based network, the at least one template being associated with at least one asset of at least one party in the plurality of parties;
   subscribing, by the at least one server, at least one second party of the plurality of parties to the subscription-based network, the subscribing comprising:
   receiving a second data from the at least one second party, the second data comprising an identifier of the at least one asset and related to the first data;
   matching, based on the identifier, at least a portion of the second data with at least a portion of the first information or the first data; and
   subscribing the at least one second party to the subscription-based network based on the matching;
   generating, by the at least one server, using the at least one template, a second information based on the second data received from the at least one second party;
   creating, by the at least one server and based on the at least one template, a uniform record containing a combination of the first information and the second information associated with the at least one asset; and
   storing, by the at least one server, the created uniform record.

2. The method according to claim 1, wherein the at least one first party and the at least one second party include at least one of the following: an asset provider, an asset operator, a service provider, and a third party.

3. The method according to claim 2, wherein the first data is generated by the asset provider, wherein the identifier comprises a serial number and/or a manufacturer name.

4. The method according to claim 3, wherein the first data includes at least one of the following: an equipment taxonomy information, a nameplate information, equipment installation parameters, equipment design and drawings, equipment structure/parts, equipment failure codes/modes of operation, equipment safety controls, equipment process controls, equipment measuring point/telemetry requests, equipment maintenance/inspection strategies, equipment operation and/or maintenance instructions, equipment product training materials, equipment service bulletins and/or revision control, equipment recall information, equipment design improvements, and equipment licenses.

5. The method according to claim 2, wherein the second data is generated by the asset operator, wherein the asset operator comprises a user of the at least one asset.

6. The method according to claim 5, wherein the second data includes at least one of the following: equipment installation information, equipment risk and/or control information, equipment maintenance history, equipment usage information, equipment failure/incident data, equipment service bulletin processing, equipment recall processing, and equipment design recommendations.

7. The method according to claim 1, wherein the matching comprises:
   matching a first identifier of the first data with a second identifier of the second data.

8. The method according to claim 1, wherein the template data comprises a first template available to the plurality of parties of the subscription-based network to submit information regarding the at least one asset, wherein master data comprises data received by the at least one server and from the plurality of parties of the subscription-based network, wherein the transactional data comprises data related to a transaction performed in connection with the at least one asset, and wherein operational data comprises data related to an operations and/or a service associated with the at least one asset.

9. A system comprising:
   at least one programmable processor; and
   a machine-readable medium storing instructions that, when executed by the at least one programmable processor, cause the at least one programmable processor to perform operations comprising:
   subscribing a plurality of parties to a subscription-based network, the plurality of parties including at least one first party receiving a first data from the at least one first party, the first data comprising template data, master data, transactional data, and/or operational data;

generating, by at the least one server and in response to receiving the first data, using at least one template, a first information based on, the at least one first party being a member of the subscription-based network, the at least one template being associated with at least one asset of at least one party in the plurality of parties;

subscribing, by the at least one server, at least one second party of the plurality of parties to the subscription-based network, the subscribing comprising:

receiving a second data from the at least one second party, the second data comprising an identifier of the at least one asset and related to the first data;

matching, based on the identifier, at least a portion of the second data with at least a portion of the first information or the first data; and subscribing the at least one second party to the subscription-based network based on the matching;

generating, by the at least one server, using the at least one template, a second information based on the second data received from the at least one second party; and creating, by the at least one server and based on the at least one template, a uniform record containing a combination of the first information and the second information associated with the at least one asset; and storing, by the at least one server, the created uniform record.

10. The system according to claim 9, wherein the at least one first party and the at least one second party include at least one of the following: an asset provider, an asset operator, a service provider, and a third party.

11. The system according to claim 10, wherein the first data is generated by the asset provider, wherein the identifier comprises a serial number and/or a manufacturer name.

12. The system according to claim 11, wherein the first data includes at least one of the following: an equipment taxonomy information, a nameplate information, equipment installation parameters, equipment design and drawings, equipment structure/parts, equipment failure codes/modes of operation, equipment safety controls, equipment process controls, equipment measuring point/telemetry requests, equipment maintenance/inspection strategies, equipment operation and/or maintenance instructions, equipment product training materials, equipment service bulletins and/or revision control, equipment recall information, equipment design improvements, and equipment licenses.

13. The system according to claim 10, wherein the second data is generated by the asset operator, wherein the asset operator comprises a user of the at least one asset.

14. The system according to claim 13, wherein the second data includes at least one of the following: equipment installation information, equipment risk and/or control information, equipment maintenance history, equipment usage information, equipment failure/incident data, equipment service bulletin processing, equipment recall processing, and equipment design recommendations.

15. A computer program product comprising a machine-readable medium storing instructions that, when executed by at least one programmable processor, cause the at least one programmable processor to perform operations comprising:

subscribing, by at least one server, a plurality of parties to a subscription-based network, the plurality of parties including at least one first party receiving, by the at least one server, a first data from the at least one first party, the first data comprising template data, master data, transactional data, and/or operational data;

generating, by at the least one server and in response to receiving the first data, using at least one template, a first information based on, the at least one first party being a member of the subscription-based network, the at least one template being associated with at least one asset of at least one party in the plurality of parties;

subscribing, by the at least one server, at least one second party of the plurality of parties to the subscription-based network, the subscribing comprising:

receiving a second data from the at least one second party, the second data comprising an identifier of the at least one asset and related to the first data;

matching, based on the identifier, at least a portion of the second data with at least a portion of the first information or the first data; and subscribing the at least one second party to the subscription-based network based on the matching;

generating, by the at least one server, using the at least one template, a second information based on the second data received from the at least one second party; and creating, by the at least one server and based on the at least one template, a uniform record containing a combination of the first information and the second information associated with the at least one asset; and storing, by the at least one server, the created uniform record.

16. The computer program product according to claim 15, wherein the at least one first party and the at least one second party include at least one of the following: an asset provider, an asset operator, a service provider, and a third party.

17. The computer program product according to claim 16, wherein the first data is generated by the asset provider, wherein the identifier comprises a serial number and/or a manufacturer name.

18. The computer program product according to claim 17, wherein the first data includes at least one of the following: an equipment taxonomy information, a nameplate information, equipment installation parameters, equipment design and drawings, equipment structure/parts, equipment failure codes/modes of operation, equipment safety controls, equipment process controls, equipment measuring point/telemetry requests, equipment maintenance/inspection strategies, equipment operation and/or maintenance instructions, equipment product training materials, equipment service bulletins and/or revision control, equipment recall information, equipment design improvements, and equipment licenses.

19. The computer program product according to claim 16, wherein the second data is generated by the asset operator, wherein the asset operator comprises a user of the at least one asset.

20. The computer program product according to claim 19, wherein the second data includes at least one of the following: equipment installation information, equipment risk and/or control information, equipment maintenance history, equipment usage information, equipment failure/incident data, equipment service bulletin processing, equipment recall processing, and equipment design recommendations.

* * * * *